US009401160B2

(12) United States Patent
Sehlstedt

(10) Patent No.: US 9,401,160 B2
(45) Date of Patent: Jul. 26, 2016

(54) METHODS AND VOICE ACTIVITY DETECTORS FOR SPEECH ENCODERS

(75) Inventor: Martin Sehlstedt, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 434 days.

(21) Appl. No.: 13/502,535

(22) PCT Filed: Oct. 18, 2010

(86) PCT No.: PCT/SE2010/051117
§ 371 (c)(1), (2), (4) Date: Apr. 18, 2012

(87) PCT Pub. No.: WO2011/049515
PCT Pub. Date: Apr. 28, 2011

(65) Prior Publication Data
US 2012/0215536 A1 Aug. 23, 2012

Related U.S. Application Data

(60) Provisional application No. 61/252,966, filed on Oct. 19, 2009.

(51) Int. Cl.
*G10L 17/00* (2013.01)
*G10L 25/78* (2013.01)
(Continued)

(52) U.S. Cl.
CPC ............. *G10L 25/78* (2013.01); *G10L 21/0208* (2013.01); *G10L 25/87* (2013.01); *G10L 2025/786* (2013.01)

(58) Field of Classification Search
CPC ................ G10L 21/0208; G10L 25/78; G10L 2025/786; G10L 25/87
USPC .................................................. 704/226, 246
See application file for complete search history.

(56) References Cited

U.S. PATENT DOCUMENTS 6,023,674 A * 2/2000 Mekuria ................ G10L 25/78 704/207
6,088,668 A * 7/2000 Zack .................. G10L 21/0208 381/94.3

(Continued)

FOREIGN PATENT DOCUMENTS

CN 101320559 A 12/2008
EP 1265224 A1 12/2002

(Continued)

OTHER PUBLICATIONS

Wang, Zhe, Huawei Technologies China, "Proposed text for draft new ITU-T Recommendation G.GSAD & Generic sound activity detector; C 348", ITU-T-Draft; Study Period 2009-2012, International Telecommunication Union, Geneva; CH. vol. 8/16, Oct. 18, 2009, 14 pages.

(Continued)

*Primary Examiner* — James Wozniak
*Assistant Examiner* — Oluwadamilola M Ogunbiyi
(74) *Attorney, Agent, or Firm* — Myers Bigel & Sibley, P.A.

(57) ABSTRACT

Voice activity detectors and related methods are provided. Methods include receiving a frame of the input signal; determining a first SNR of the received frame; comparing the determined first SNR with an adaptive threshold; and detecting whether the received frame comprises voice based on the comparison. The adaptive threshold is at least based on total noise energy of a noise level, an estimate of a second SNR and on energy variation between different frames.

12 Claims, 3 Drawing Sheets

(51) Int. Cl.
*G10L 21/0208* (2013.01)
*G10L 25/87* (2013.01)

(56) References Cited

U.S. PATENT DOCUMENTS

| | | | | |
|---|---|---|---|---|
| 6,122,384 | A * | 9/2000 | Mauro | 381/94.3 |
| 6,556,967 | B1 * | 4/2003 | Nelson et al. | 704/233 |
| 6,629,070 | B1 * | 9/2003 | Nagasaki | 704/233 |
| 6,889,187 | B2 * | 5/2005 | Zhang | 704/253 |
| 7,058,572 | B1 * | 6/2006 | Nemer | G10L 21/0208 704/226 |
| 7,283,956 | B2 * | 10/2007 | Ashley | H04B 1/1027 704/224 |
| 7,366,658 | B2 * | 4/2008 | Moogi | G10L 21/0208 381/94.3 |
| 7,693,708 | B2 * | 4/2010 | Gournay et al. | 704/201 |
| 7,873,114 | B2 * | 1/2011 | Lin | H04L 25/0202 375/285 |
| 8,275,609 | B2 * | 9/2012 | Wang | 704/214 |
| 8,311,813 | B2 * | 11/2012 | Valsan | G10L 25/78 704/213 |
| 2005/0108006 | A1 * | 5/2005 | Jurd et al. | 704/212 |
| 2005/0143989 | A1 * | 6/2005 | Jelinek | 704/226 |
| 2008/0010065 | A1 * | 1/2008 | Bratt et al. | 704/246 |
| 2008/0235011 | A1 * | 9/2008 | Archibald | 704/225 |

FOREIGN PATENT DOCUMENTS

| | | | |
|---|---|---|---|
| EP | 2 159 788 | A1 | 3/2010 |
| EP | 2159788 | A1 | 3/2010 |
| JP | 2000-330598 | | 11/2000 |
| WO | WO 2007091956 | A2 | 8/2007 |
| WO | WO 2008143569 | A1 | 11/2008 |
| WO | WO 2008/148323 | A1 | 12/2008 |
| WO | WO 2009/000073 | A1 | 12/2008 |

OTHER PUBLICATIONS

Extended European Search Report, EP 10025288.7, Oct. 2, 2013.

Davis et al, “A Low Complexity Statistical Voice Activity Detector with Performance Comparisons to ITU-T/ETSI Voice Activity Detectors,” Proceedings of the 2003 Joint Conference of the Fourth International Conference on Information, Communications and Signal Processing, 2003 and the Fourth Pacific Rim Conference on Multimedia, vol. 1, Dec. 15-18, 2003, pp. 119-123.

International Search Report, PCT/SE2010/051117, Feb. 8, 2011.

Notification of Transmittal of the International Search Report and the Written Opinion of the International Searching Authority, or the Declaration, PCT/SE2010/051117, Feb. 8, 2011.

Response to Written Opinion, PCT/SE2010/051117, Jun. 16, 2011.

International Preliminary Report on Patentability, PCT/SE2010/051117, Sep. 19, 2011.

Notice of Reasons for Rejection, JP 2012-535163, Apr. 22, 2014, 3 pages.

Notice of Reasons for Rejection, JP 2012-535163, Feb. 3, 2015, 4 pages.

* cited by examiner

METHODS AND VOICE ACTIVITY DETECTORS FOR SPEECH ENCODERS

CROSS-REFERENCE TO RELATED APPLICATION

This application is a 35 U.S.C. §371 national stage application of PCT International Application No. PCT/SE2010/051117, filed on Oct. 18, 2010, which claims priority to U.S. Provisional Application No. 61/252,966, filed on Oct. 19, 2009, the entire contents of which are incorporated by reference herein as if set forth in their entirety. The above-referenced PCT International Application was published in the English language as International Publication No. WO 2011/049515 on Apr. 28, 2011.

FIELD

The embodiments of the present invention relates to a method and a voice activity detector, and in particular to threshold adaptation for the voice activity detector.

BACKGROUND

In speech coding systems used for conversational speech it is common to use discontinuous transmission (DTX) to increase the efficiency of the encoding. The reason is that conversational speech contains large amounts of pauses embedded in the speech, e.g. while one person is talking the other one is listening. So with DTX the speech encoder is only active about 50 percent of the time on average and the rest can be encoded using comfort noise. Comfort noise is an artificial noise generated in the decoder side and only resembles the characteristics of the noise on the encoder side and therefore requires less bandwidth. Some example codecs that have this feature are the AMR NB (Adaptive Multi-Rate Narrowband) and EVRC (Enhanced Variable Rate CODEC). Note AMR NB uses DTX and EVRC uses variable rate (VBR), where a Rate Determination Algorithm (RDA) decides which data rate to use for each frame, based on a VAD (voice activity detection) decision.

For high quality DTX operation, i.e. without degraded speech quality, it is important to detect the periods of speech in the input signal this is done by the Voice Activity Detector (VAD), which is used in both for DTX and RDA. It should be noted that speech is also referred to as voice. FIG. 1 shows an overview block diagram of a generalized VAD 180, which takes the input signal 100, divided into data frames, 5-30 ms depending on the implementation, as input and produces VAD decisions as output 160. I.e. a VAD decision 160 is a decision for each frame whether the frame contains speech or noise).

The generic VAD 180 comprises a background estimator 130 which provides sub-band energy estimates and a feature extractor 120 providing the feature sub-band energy. For each frame, the generic VAD 180 calculates features and to identify active frames the feature(s) for the current frame are compared with an estimate of how the feature "looks" for the background signal.

A primary decision, "vad_prim" 150, is made by a primary voice activity detector 140 and is basically just a comparison of the features for the current frame and the background features estimated from previous input frames, where a difference larger than a threshold causes an active primary decision. A hangover addition 170 is used to extend the primary decision based on past primary decisions to form the final decision, "vad_flag" 160. The reason for using hangover is mainly to reduce/remove the risk of mid speech and backend clipping of speech bursts. However, the hangover can also be used to avoid clipping in music passages. An operation controller 110 may adjust the threshold(s) for the primary detector and the length of the hangover according to the characteristics of the input signal.

There are a number of different features that can be used for VAD detection. The most basic feature is to look just at the frame energy and compare this with a threshold to decide if the frame is speech or not. This scheme works reasonably well for conditions where the SNR is high but not for low SNR, (signal-to-noise ratio) cases. In low SNR cases other metrics comparing the characteristics of the speech and noise signals must be used instead. For real-time implementations an additional requirement on VAD functionality is computational complexity and this is reflected in the frequent representation of subband SNR VADs in standard codecs, e.g. AMR NB, AMR WB (Adaptive Multi-Rate Wideband), EVRC, and G.718 (ITU-T recommendation embedded scalable speech and audio codec). These example codecs also use threshold adaptation in various forms. In general background and speech level estimates, which also are used for SNR estimation, can be based on decision feedback or an independent secondary VAD for the update. In either case VAD=0 is to be interpreted that the input signal is estimated as noise and VAD=1 that the input signal is estimated as speech. Another option for level estimates is to use minimum and maximum input energy to track the background and speech respectively. For the variability of the input noise it is possible to calculate the variance of prior frames over a sliding time window. Another solution is to monitor the amount of negative input SNR. This is however based on the assumption that negative SNR only arises due to variations in the input noise. Sliding time window of prior frames implies that one creates a buffer with variables of interest (frame energy or sub-band energies) for a specified number of prior frames. As new frames arrive the buffer is updated by removing the oldest values from the buffer and inserting the newest.

Non-stationary noise can be difficult for all VADs, especially under low SNR conditions, which results in a higher VAD activity compared to the actual speech and reduced capacity from a system perspective. I.e. frames not comprising speech are identified to comprise speech. Of the non-stationary noise, the most difficult noise for the VADs to handle is babble noise and the reason is that its characteristics are relatively close to the speech signal that the VAD is designed to detect. Babble noise is usually characterized both by the SNR relative to the speech level of the foreground speaker and the number of background talkers, where a common definition as used in subjective evaluations is that babble should have 40 or more background speakers. The basic motivation being that for babble it should not be possible to follow any of the included speakers in the babble noise implying that non of the babble speakers shall become intelligible. It should also be noted that with an increasing number of talkers in the babble noise, the babble noise becomes more stationary. With only one (or a few) speaker(s) in the background they are usually called interfering talker(s). A further problematic issue is that babble noise may have spectral variation characteristics very similar to some music pieces that the VAD algorithm shall not suppress.

In the previously mentioned VAD solutions AMR NB/WB, EVRC and G.718 there are varying degrees of problem with babble noise in some cases already at reasonable SNRs (20 dB). The result is that the assumed capacity gain from using DTX can not be realized. In real mobile phone systems it has also been noted that it may not be enough to require reasonable DTX/VBR operation in 15-20 dB SNR. If possible one would desire reasonable DTX/VBR operation down to 5 dB even 0 dB depending on the noise type. For low frequency background noise an SNR gain of 10-15 dB can be achieved for the VAD functionality just by highpass filtering the signal before VAD analysis. Due to the similarity of babble to speech the gain from highpass filtering the input signal is very low.

For VADs based on subband SNR principle when the input signal is divided in a plurality of sub-bands, and the SNR is determined for each band, it has been shown that the introduction of a non-linearity in the subband SNR calculation, called significance thresholds, can improve VAD performance for conditions with non-stationary noise such as babble noise and office background noise.

It has also been noted that the G.718 shows problems with tracking the background noise for some types of input noise, including babble type noise. This causes problems with the VAD as accurate background estimates are essential for any type of VAD comparing current input with an estimated background.

From a quality point of view it is better to use a failsafe VAD, meaning that when in doubt it is better for the VAD to signal speech input than noise input and thereby allowing for a large amount of extra activity. This may, from a system capacity point view, be acceptable as long as only a few of the users are in situations with non-stationary background noise. However, with an increasing number of users in non-stationary environments the usage of failsafe VAD may cause significant loss of system capacity. It is therefore becoming important to work on pushing the boundary between failsafe and normal VAD operation so that a larger class of non-stationary environments are handled using normal VAD operation.

Though the usage of significance thresholds improving VAD performance it has been noted that it may also cause occasional speech clippings, mainly front end clippings of low SNR unvoiced sounds.

As was shown in above it is already common to use some form of threshold adaptation. From prior art there are examples where $$VAD_{thr}=f(N_{tot}),$$

$$VAD_{thr}=f(N_{tot},E_{sp}), \text{ or}$$

$$VAD_{thr}=f(SNR,N_v)$$

Where: $VAD_{thr}$ is the VAD threshold, $N_{tot}$ is the estimated noise energy, $E_{sp}$ is the estimated speech energy, SNR is the estimated signal to noise ratio, and $N_v$ is the estimated noise variations based on negative SNR.

SUMMARY

The object of embodiments of the present invention is to provide a mechanism that provides a VAD with improved performance.

This is achieved according to one embodiment by letting a VAD threshold $VAD_{thr}$ be a function of a total noise energy $N_{tot}$, an SNR estimate and $N_{var}$ wherein $N_{var}$ indicates the energy variation between different frames.

According to one aspect of embodiments of the present invention a method in a voice activity detector for determining whether frames of an input signal comprise voice is provided. In the method, a frame of the input signal is received and a first SNR of the received frame is determined. The determined first SNR is then compared with an adaptive threshold. The adaptive threshold is at least based on total noise energy of a noise level, an estimate of a second SNR and an energy variation between different frames. Based on said comparison it is detected whether the received frame comprises voice.

According to another aspect of embodiments of the present invention a voice activity detector is provided. The voice activity detector may be a primary voice activity detector being a part of a voice activity detector for determining whether frames of an input signal comprise voice. The voice activity detector comprises an input section configured to receive a frame of the input signal. The voice activity detector further comprises a processor configured to determine a first SNR of the received frame, and to compare the determined first SNR with an adaptive threshold. The adaptive threshold is at least based on total noise energy of a noise level, an estimate of a second SNR and on energy variation between different frames. Moreover, the processor is configured to detect whether the received frame comprises voice based on said comparison.

According to a further embodiment, a further parameter referred to as $E_{dyn\_LP}$ is introduced and $VAD_{thr}$ is hence determined at least based on the total noise energy $N_{tot}$, the second SNR estimate, $N_{var}$ and $E_{dyn\_LP}$. $E_{dyn\_LP}$ is a smooth input dynamics measure indicative of energy dynamics of the received frame. In this embodiment, the adaptive threshold $VAD_{thr}=f(N_{tot}, SNR, N_{var} E_{dyn\_LP})$.

An advantage by using $N_{var}$ or $N_{var}$ and $E_{dyn\_LP}$ when selecting $VAD_{thr}$, is that it is possible to avoid increasing the $VAD_{thr}$ although the background noise is non-stationary. Thus, a more reliable VAD threshold adaptation function can be achieved. With new combinations of features it is possible to better characterize the input noise and to adjust the threshold accordingly.

With the improved VAD threshold adaptation according to embodiments of the present invention, it is possible to achieve considerable improvement in handling of non-stationary background noise, and babble noise in particular, while maintaining the quality for speech input and for music type input in cases where music segments are similar to spectral variations found in babble noise.

DETAILED DESCRIPTION

Figure 1:
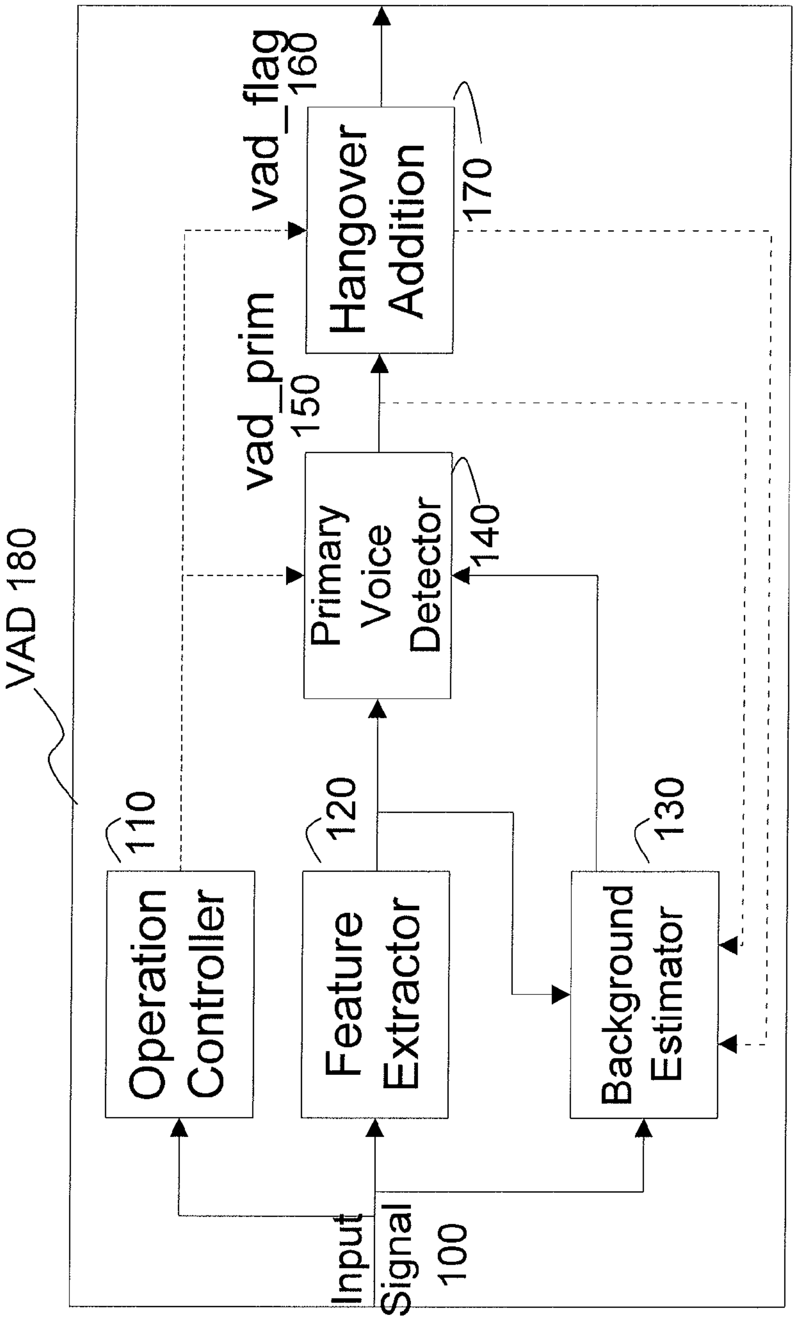
FIG. 1 shows a generic Voice Activity Detector (VAD) with background estimation according to prior art.

The embodiments of the present invention will be described more fully hereinafter with reference to the accompanying drawings, in which preferred embodiments of the invention are shown. The embodiments may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like reference signs refer to like elements.

Moreover, those skilled in the art will appreciate that the means and functions explained herein below may be implemented using software functioning in conjunction with a programmed microprocessor or general purpose computer, and/or using an application specific integrated circuit (ASIC).

It will also be appreciated that while the current embodiments are primarily described in the form of methods and devices, the embodiments may also be embodied in a computer program product as well as a system comprising a computer processor and a memory coupled to the processor, wherein the memory is encoded with one or more programs that may perform the functions disclosed herein.

For a subband SNR based VAD even moderate variations of input energy can cause false positive decisions for the VAD, i.e. the VAD indicates speech when the input is only noise. Subband SNR based VAD implies that the SNR is determined for each subband and a combined SNR is determined based on those SNRs. The combined SNR, may be a sum of all SNRs on different subbands. This kind of sensitivity in a VAD is good for speech quality as the probability of missing a speech segment is small. However, since these types of energy variations are typical in non-stationary noise, e.g. babble noise, they will cause excessive VAD activity. Thus in the embodiments of the present invention an improved adaptive threshold for voice activity detection is introduced.

In a first embodiment a first additional feature $N_{var}$ is introduced which indicates the noise variation which is an improved estimator of variability of frame energy for noise input. This feature is used as a variable when the improved adaptive threshold is determined. A first SNR, which may be a combined SNR created by different subband SNRs, is compared with the improved adaptive threshold to determine whether a received frame comprises speech or background noise. Hence in the first embodiment, the threshold adaptation for a VAD is made as a function of the features: noise energy $N_{tot}$, a second SNR estimate SNR (corresponding to lp_snr in the pseudo code below), and the first additional feature $N_{var}$. The noise energy $N_{tot}$ is an estimate of the noise level based on the total energy of the subband energies in the background estimate when VAD=0 and the second SNR estimate is a long term SNR estimate. Long term SNR estimate implies that the SNR is measured over a longer time than a short term SNR estimate.

In a second embodiment, a second additional feature $E_{dyn\_LP}$ is introduced. $E_{dyn\_LP}$ is a smooth input dynamics measure. Accordingly, the threshold adaptation for subbands SNR VAD is made as a function of the features, noise energy $N_{tot}$, a second SNR estimate SNR, and the new feature noise variation $N_{var}$. Further, if the second SNR estimate is lower than the smooth input dynamics measure, $E_{dyn\_LP}$, the second SNR is adjusted upwards before it is used for determining the adaptive threshold.

By determining the adaptive threshold for making the VAD decision based en these variables, it is possible to improve the threshold adaptation with better control of when to use a highly sensitivity VAD and when the sensitivity has to be reduced. The first additional noise variation feature is mainly use to adjust the sensitivity depending on the non-stationary of the input background signal, while the second additional smooth input dynamics feature is used to adjust the second SNR estimate used for the threshold adaptation.

From a system perspective the ability to reduce the sensitivity for non-stationary noise will result in a reduction in excessive activity for non-stationary noise (e.g. babble noise) while maintaining the high quality of encoded speech for clean and stationary noise in high SNR.

In the following the features used to calculate the adaptive threshold according to the embodiments are explained:

According to the second embodiment, there are two additional features used for determining the improved adaptive threshold. The first additional feature is a noise variation estimator $N_{var}$.

$N_{var}$ is a noise variation estimate created by comparing the input energy which is the sum of all subband energies of a current frame and the energy of a previous frame the background. Hence the noise variation estimate is based on VAD decisions for the previous frame. When VAD=0 it is assumed that the input consists of background noise only so to estimate the variability the new metric is formed as a non-linear function of the frame to frame energy difference.

Two input energy trackers, $E_{tot\_l}$, $E_{tot\_h}$, one from below and one from above are used to create the second additional feature $E_{dyn\_LP}$ which indicates smooth input energy dynamics.

$E_{tot\_l}$ is the energy tracker from below. For each frame the value is incremented by a small constant value. If this new value is larger than the current frame energy the frame energy is used as the new value.

$E_{tot\_h}$ is the energy tracker from above. For each frame the value is decremented by a small constant value if this new value is smaller than the current frame energy the frame energy is used as the new value.

$E_{dyn\_LP}$ indicating smooth input dynamics serves as a long term estimate of the input signal dynamics, i.e. an estimate of the difference between speech and noise energy. It is based only on the input energy of each frame. It uses the energy tracker from above, the high/max energy tracker, referred to as $E_{tot\_h}$ and the one from below, the low/min energy tracker referred to as $E_{tot\_1}$, $E_{dyn\_LP}$ is then formed as a smoothed value of the difference between the high and low energy trackers.

For each frame the difference between the energy trackers is used as input to a low pass filter.

$$E_{dyn\_LP}=(1-a)E_{dyn\_LP}+\alpha(E_{tot\_h}-E_{tot\_l})$$

First the absolute value of the frame energy difference is calculated based on current and last frame. If VAD=0 the current variation estimate is then first decreased using as small constant value.

If the current energy difference is larger than the current variation estimate the new value replaces the current variation estimate with the condition that the current variation estimate may not increase beyond a fixed constant for each frame.

Figure 2:
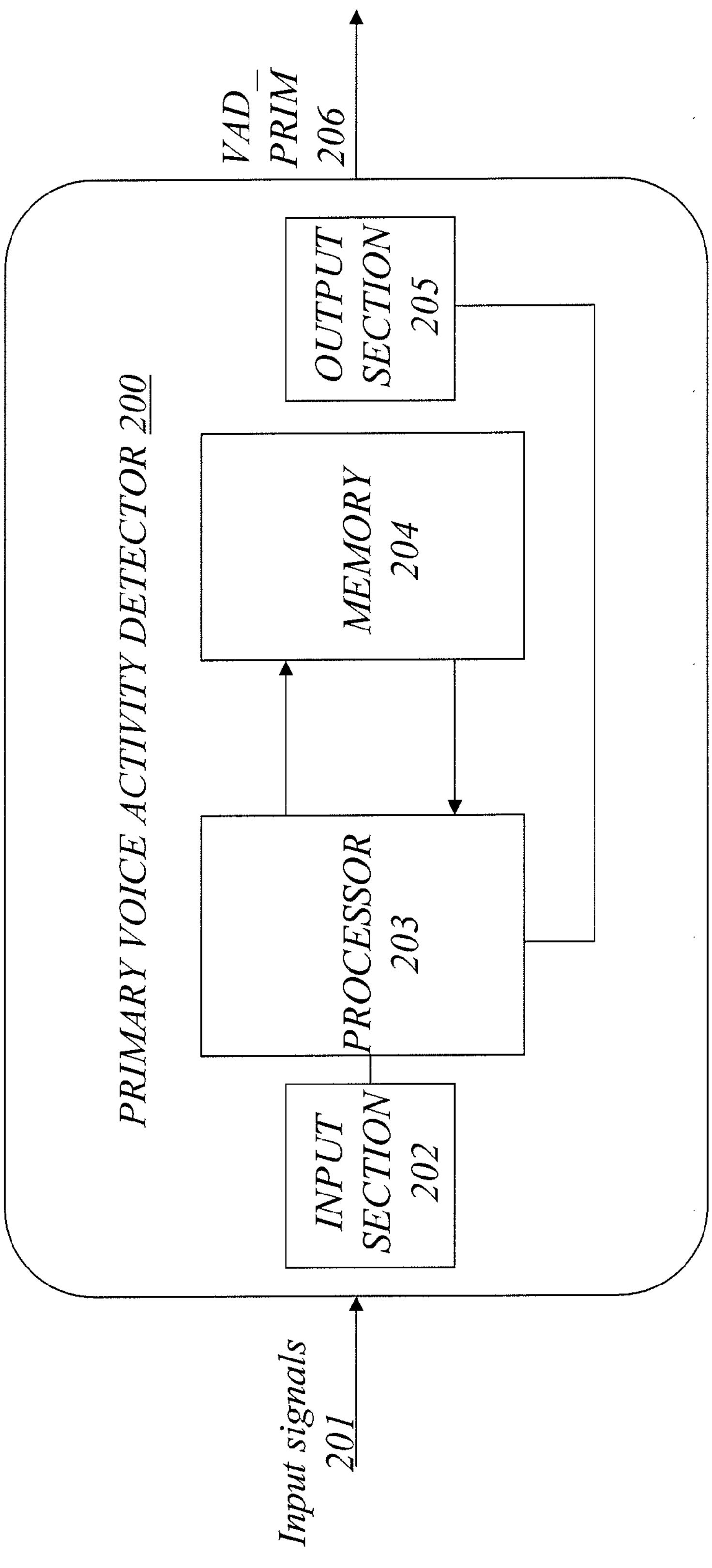
FIG. 2 illustrates schematically a voice activity detector according to embodiments of the present invention.

Turning now to FIG. 2, showing a voice activity detector 200 wherein the embodiments of the present invention may be implemented. In the embodiments the voice activity detector 200 is exemplified by a primary voice activity detector. The voice activity detector 200 comprises an input section 202 for receiving input signals and an output section 205 for outputting the voice activity detection decision. Furthermore, a processor 203 is comprised in the VAD and a memory 204 may also be comprised in the voice activity detector 200. The memory 204 may store software code portions and history information regarding previous noise and speech levels. The processor 203 may include one or more processing units.

When the VAD is exemplified by a primary VAD, input signals 201 to the input section 202 of the primary voice activity detector are, sub-band energy estimates of the current input frame, sub-band energy estimates from the background estimator shown in FIG. 1, long term noise level, long term speech level for long term SNR calculation and long term noise level variation from the feature extractor 120 of FIG. 1. The long term speech and noise levels are estimated using the VAD flag. When VAD==0 the long term noise estimate is updated using smoothing of the total noise, $N_{tot}$, value. Similarly a long term speech level is updated when VAD==1 using smoothing of $E_{tot}$ (total energy of the input frame) based on the total subband energy of the current input frame.

Hence the voice activity detector 200 comprises a processor 203 configured to compare a first SNR of the received frames and an adaptive threshold to make the VAD decision. The processor 203 is according to one embodiment configured to determine the first SNR (snr_sum) and the first SNR is formed by the input subband energy levels divided by background energy levels. Thus the first SNR used to determine VAD activity is a combined SNR created by different subband SNRs, e.g. by adding the different subband SNRs.

The adaptive threshold is a function of the features: noise energy $N_{tot}$, an estimate of a second SNR (SNR) and the first additional feature $N_{var}$ in a first embodiment. In a second embodiment $E_{dyn\_lp}$ is also taken into account when determining the adaptive threshold. The second SNR is in the exemplified embodiments a long term SNR (lp_snr) measured over a plurality of frames.

Further, the processor 203 is configured to detect whether the received frame comprises voice based on the comparison between the first SNR and the adaptive threshold. This decision is referred to as a primary decision, vad_prim 206 and is sent to a hangover addition via the output section 205. The VAD can then use the vad_prim 206 when making the final VAD decision.

According to a further embodiment, the processor 203 is configured to adjust the estimate of the second SNR of the received frame upwards if the current estimate of the second SNR is lower than a smooth input dynamics measure, wherein the smooth input dynamics measure is indicative of energy dynamics of the received frame.

A detailed description of embodiments will follow. In this description the G.718 codec (further explained in ITU-T, "Frame error robust narrowband and wideband embedded variable bit-rate coding of speech and audio from 8-32 kbit/s", ITU-T G.718, June 2008) is used as the basis for this description.

TABLE 1

| Notation in this description | Description of parameter |
|---|---|
| snr_sum | SNR per frame |
| snr[i] | SNR per critical band i |
| 0.2 * enr0[i] + 0.4 * pt1++ + 0.4 * pt2++ | Average energy per critical band i |
| lp_speech | Long term speech level |
| lp_noise | Long term noise level |
| lp_snr | Long term SNR |
| hanover_short | Hangover counter |
| frame | Frame counter for initiation |
| vad | SAD decision flag for current frame |
| totalNoise | Noise level estimate for current frame (in dB) $N_{tot}$ |
| Etot | Total energy of Input frame (in dB) $E_t$ |
| thr1 | VAD Threshold (in dB) |

Figure 3:
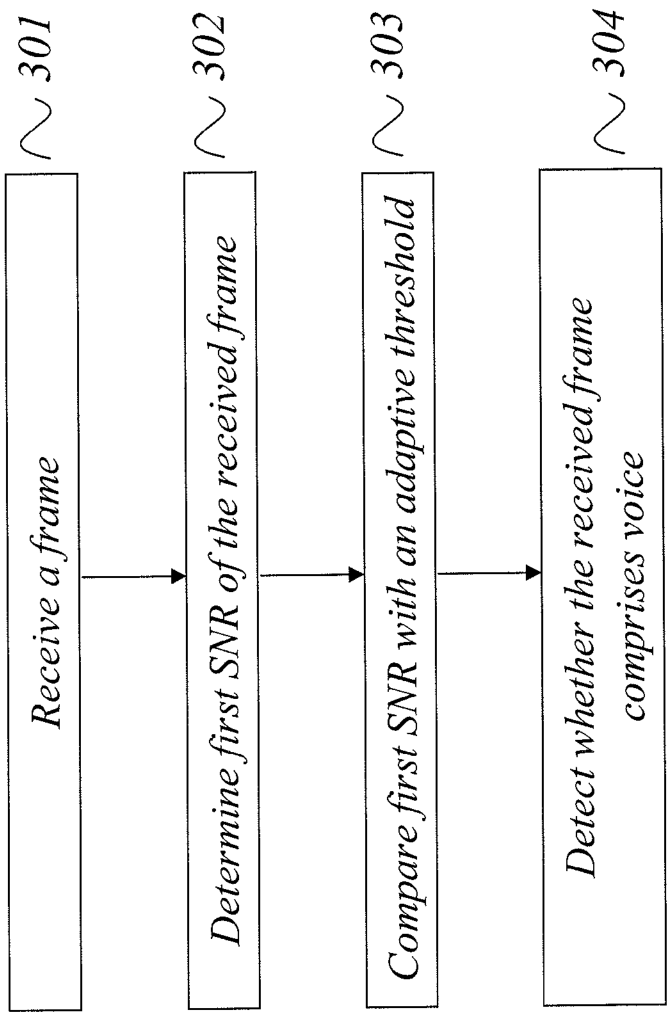
FIG. 3 is a flowchart of a method according to embodiments of the present invention.

According to one aspect of the present invention a method in a voice activity detector 200 for determining whether frames of an input signal comprise voice is provided as illustrated in the flowchart of FIG. 3. The method comprises in a first step 301 receiving a frame of the input signal and determining 302 a first SNR. of the received frame. The first SNR may be a combined SNR of the different subbands, e.g. a sum of the SNRs of the different subbands. The determined first SNR is compared 303 with an adaptive threshold, wherein the adaptive threshold is at least based on total noise energy an estimate of a second SNR SNR (lp_snr), and the first additional feature $N_{tot}$, in a first embodiment. In the second embodiment $E_{dyn\_LP}$ is also taken into account when determining the adaptive threshold. The second SNR is in the exemplified embodiments a long term SNR calculated over a plurality of frames. Further, it is detected 304 whether the received frame comprises voice based on said comparison.

According to embodiments of the invention the determined first SNR of the received frame is a combined SNR of different subbands of the received frame. The combined first SNR, also referred to as snr_sum according to the table above, may be calculated as:

```
snr_sum = 0;
for (b=0;b<20;b++) {
   snr[b] = ( 0.2 * enr0[b] + 0.4 * pt1++ + 0.4 * pt2++) / bckr[b];
   if (snr[i] < 1.0) {
      snr[i] = 1.0;
   }
   snr_sum = snr_sum + snr[i];
}
snr_sum = 10 * log10(snr_sum);
```

Before the threshold can be applied to the snr_sum exemplified above, the threshold must be calculated based on the current input conditions and long term SNR. It should be noted that in this example, the threshold adaptation is only dependent on long term SNR (lp_snr) according to prior art.

```
lp_snr = lp_speech −lp_noise;
if (lp_snr < 35) {
   thr1 = 0.41287 * lp_snr + 13.259625;
   hangover_short = 2;
   if (lp_snr >= 15)
      hangover_short = 1;
}
else {
   thr1 = 1.0333 * lp_snr − 18;
}
```

The long term speech and noise levels are calculated as follows:

```
if (frame < 5) {
   lp_noise = totalNoise;
   tmp = lp_noise+10;
   if (lp_speech < tmp)
      lp_speech =tmp;
}
else {
   if (vad == 0)
      lp_noise = 0.99 * lp_noise + 0.01 * totalNoise;
   else
      lp_speech = 0.99 * lp_speech + 0.01 * Etot;
}
```

Initiation of long term speech energy and frame counter
lp_speech=45.0;
frame=0;

The embodiments of the present invention use an improved logic for the VAD threshold adaptation which is based on both features used in prior art and additional features introduced with the embodiments of the invention. In the following an example implementation is given as a modification of the pseudo code for the above described basis.

It should be noted that there are a number of constants for the thresholds and system parameters used in this description which are only examples. However, further tuning with a variety of input signals is also within the scope of the embodiments of the present invention.

As mentioned above, the second embodiment introduces the new features: the first additional feature noise variation $N_{var}$ and the second additional feature $E_{dyn\_LP}$ which is indicative of smooth input energy dynamics. In the pseudo code below, $N_{var}$ is denoted Etot_v_h and $E_{dyn\_LP}$ is denoted sign_dyn_lp. The signal dynamics sign_dyn_lp is estimated by tracking the input energy from below Etot_l and above Etot_h. The difference is then used as input to a low passfilter to get the smoothed signal dynamics measure sign_dyn_lp. In order to further clarify the embodiments, the pseudo code written with bold characters relates to the new features of the embodiments while the other pseudo code relates to prior art.

```
Etot__l += 0.05;
if (Etot < Etot__l)
   Etot__l = Etot;
Etot__h -= 0.05;
if (Etot > Etot__h)
   Etot__h = Etot;
sign__dyn__lp = 0.1 * (Etot__h - Etot__l) + 0.9 sign__dyn__lp;
```

The noise variance estimate is made from the input total energy (in log domain) using Etot_v which measures the absolute energy variation between frames, i.e. the absolute value of the instantaneous energy variation between frames. Note that the feature Etot_v_h is limited to only increase a maximum of a small constant value 0.2 for each frame. Further the variable Etot_last is just the energy level of the previous frame. It is also possible to use the last frame where vad_flag==0 to avoid large energy drops at the end of speech bursts according to an embodiment of the present invention.

```
Etot__v = fabs(Etot__last - Etot);
If (vad__flag == 0) {
   Etot__v__h = Etot__v__h - 0.01;
   if (Etot__v > Etot__v__h)
      Etot__v__h = (Etot__v - Etot__v__h) > 0.2 ? Etot__v__h + 0.2 :
      Etot__v;
}
Etot__last = Etot;
```

Etot_v_h also denoted $N_{var}$ is a feature providing a conservative estimation of the level variations between frames, which is used to characterize the input signal. Hence, Etot_v_h describes an estimate of envelope tracking of energy variations frame to frame for noise frames with limitations on how quick the estimate may increase.

According to an embodiment, the average SNR per frame is enhanced with the use of significance thresholds which can be implemented in the following way:

```
snr__sum = 0
for (i=0;i<20;i++) {
   snr[i] = ( 0.2 * enr0[i] + 0.4 * pt1++ + 0.4 * pt2++) / bckr[i];
   if (snr[i] < 0.1) {
      snr[i] = 0.1;
   }
   if (snr[i] >= 2.5)
      snr__sum = snr__sum + snr[i];
   else {
      snr[i] = 0.1;
      snr__sum= snr__sum + 0.1;
   }
}
snr__sum = 10 * log10(snr__sum);
```

In this implementation also the estimates of long term speech and noise levels have been improved for more accurate levels. Also the initiation of speech level has been improved.

Initiation:

lp_speech=20.0;

Estimation of long term speech and noise level

```
if (frame < 5) {
   lp__noise = totalNoise;
   tmp = lp__noise+10;
   if (lp__speech < tmp)
      lp__speech =tmp;
}
else {
   lp__noise = 0.99 * lp__noise + 0.01 * totalNoise;
   if (vad == 1) {
      if (Etot >= lp__speech)
         lp__speech = 0.7 * lp__speech + 0.3 * Etot;
      else
         lp__speech = 0.99 * lp__speech + 0.01 * Etot;
}
else if (Etot__h < lp__speech)
   lp__speech = 0.7 * lp__speech + 0.3 * Etot__h;
```

Two major modifications are introduced by embodiments of the present invention. A first modification is that the long term noise level is always updated. This is motivated as the background noise estimate can be updated downwards even if VAD=1. A second modification is that the long term speech level estimate now allows for quicker tracking in case of increasing levels and the quicker tracking is also allowed for downwards adjustment but only if the lp_speech estimate is higher than the Etot_h which is a VAD decision independent speech level estimate.

With this new logic for long term level estimates according to the embodiments, the basic assumption with only noise input is that the SNR is low. However with the faster tracking input speech will quickly get a more correct long term level estimates and there by a better SNR estimate.

The improved logic for VAD threshold adaptation is based on both existing and new features. The existing feature SNR (lp_snr) has been complemented with the new features for input noise variance (Etot_v_h) and input noise level (lp_noise) as shown in the following example implementation, note that both the long term speech and noise level estimates (lp_speech,lp_noise) also have been improved as described above.

```
lp__snr = lp__speech -lp__noise;
if (lp__snr < sign__dyn__lp)
   lp__snr = lp__snr + 1;
   if (lp__snr > sign__dyn__lp)
      lp__snr = sign__dyn__lp;
   thr1 = 0.10 * lp__snr + 10.0 + 0.55 * Etot__v__h + -0.15 *
   (lp__noise - 20.0);
```

The first block of the pseudo code above shows how the smoothed input energy dynamics measure sign_dyn_lp is used. If the current SNR estimate is lower than the smoothed input energy dynamics measure sign_dyn_lp the used SNR is increased by a constant value. However, the modified SNR value can not be larger than the smoothed input energy dynamics measure sign_dyn_lp.

The second block of the pseudo code above shows the improved VAD threshold adaptation based on the new features Etot_v_h and lp_snr which is dependent on sign_dyn_lp that are used for the threshold adaptation.

The shown results are based on evaluation of mixtures of clean speech (level—26 dBov) with background noise of different types and SNRs. For clean speech input the activity it is possible to use a fixed threshold of the frame energy to get an activity value of the speech only without any hangover and in this case it was 51%.

Table 2 shows initial evaluation results, in descending order of improvement

| Noise type (with number of talkers for babble) | SNR (dB) | Activity for reference (%) | Activity using the combined inventions (%) | Activity reduction (%) |
|---|---|---|---|---|
| Babble 128 | 5 | 84 | 52 | 32 |
| Babble 64 | 5 | 90 | 61 | 31 |
| Babble 32 | 20 | 91 | 61 | 30 |
| Babble 64 | 15 | 75 | 54 | 21 |
| Car | 5 | 66 | 50 | 16 |
| Babble 64 | 20 | 57 | 52 | 5 |
| Car | 15 | 50 | 50 | 0 |
| Babble 128 | 15 | 47 | 49 | −2 |

As can be seen from the results the combined modifications shows considerable gains in lowered activity for many of the mixtures with babble noise and for the 5 dB car noise.

There is also one example, babble noise with 128 talkers and an 15 dB SNR, where the evaluation shows an activity increase, it should be noted that 2% is not that large an increase and for both the reference and the combined modification the activity is below the clean speech 51%. So in this case the increase in activity for the combined modification may actually improve subjective quality of the mixed content in comparison with the reference.

There are also cases where there is only a small or no improvement, however these are for reasonable SNR (15 and 20) and for these operating points even a much simpler energy based VAD would give reasonable performance.

Of the evaluated combinations in the table the reference only gives reasonable activity for Car and Babble 128 at 15 dB SNR. For babble 64 the reference is on the boundary for reasonable operation with an activity of 57% for a 51% clean input.

This can be compared with the embodiments that are capable of handling six of the eight evaluated combinations. The ones where the activity has reached 61% activity are babble 64 at 5 dB SNR and Babble 32 at 20 dB SNR, here it should be pointed out that the improvement over the reference are in the order of 30% units.

The combined inventions also show improvements for Car noise at low SNR, this is illustrated by the improvement for Car noise mixture at 5 dB SNR where the reference generates 66% activity while the activity for combined inventions is 50%.

Modifications and other embodiments of the disclosed invention will come to mind to one skilled in the art having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method, in a voice activity detector, for determining whether frames of an input signal comprise voice, wherein the voice activity detector comprises the steps, which are implemented by a processor, of:
- receiving a frame of the input signal;
- determining a first signal-to-noise-ratio (SNR) of the received frame by:
  - obtaining a plurality of subband SNR values of the received frame by dividing levels of each of a plurality of subbands of the received frame by its respective subband background energy;
  - applying subband specific significance thresholds to each of the plurality of subband SNR values of the received frame through selectively adjusting the plurality of subband SNR values using a non-linear function; and
  - obtaining the first SNR by summing together all non-linearly adjusted SNR values of each of the plurality of subbands;
- comparing the determined first SNR with an adaptive threshold, wherein the adaptive threshold is at least based on total noise energy of a noise level, an estimate of a second SNR, wherein the second SNR being a long term SNR, and energy variation between different frames being an estimate of envelope tracking of frame to frame energy variation for noise frames with limitations on how quickly the estimate increases such that the estimate may not increase beyond a fixed constant for each frame; and
- detecting whether the received frame comprises voice based on the comparison.

2. The method of claim 1, wherein the energy variation between different frames is the energy variation between the received frame and a last received frame which did not comprise voice.

3. The method of claim 1, wherein the estimate of the second SNR of the received frame is a long term SNR estimate, measured over a plurality of frames.

4. The method of claim 3, wherein, when comparing the determined first SNR with the adaptive threshold, the estimate of the second SNR of the received frame is adjusted upwards responsive to the current estimate of the second SNR being determined to be lower than a smooth input dynamics measure, wherein the smooth input dynamics measure is indicative of energy dynamics of the received frame.

5. The method of claim 4, wherein the smooth input dynamics measure is a function of a difference between a high/max energy tracker based on a highest frame energy value over a plurality of frames and a low/min energy tracker based on a lowest frame energy value over a plurality of frames.

6. The method of claim 4, wherein the estimate of the second SNR of the received frame is adjusted upwards to a value which is less than or equal to the smooth input dynamics measure.

7. A voice activity detector for determining whether frames of an input signal comprise voice, the voice activity detector comprising:
- an input circuit configured to receive a frame of the input signal; and
- a processor configured to:
  - determine a first signal-to-noise-ratio (SNR) of the received frame by:
    - obtaining a plurality of subband SNR values of the received frame by dividing energy levels of each of a plurality of subbands of the received frame by its respective subband background energy;
    - applying subband specific significance thresholds to each of the plurality of subband SNR values of the received frame through selectively adjusting the plurality of subband SNR values using a non-linear function; and obtaining the first SNR by summing together all non-linearly adjusted SNR values of each of the plurality of subbands;

compare the determined first SNR with an adaptive threshold, wherein the adaptive threshold is at least based on total noise energy of a noise level, an estimate of a second SNR, wherein the second SNR being a long term SNR, and energy variation between different frames being an estimate of envelope tracking of frame to frame energy variation for noise frames with limitations on how quickly the estimate increases such that the estimate may not increase beyond a fixed constant for each frame; and detecting whether the received frame comprises voice based on the comparison.

8. The voice activity of claim 7, wherein the energy variation between frames is the energy variation between the received frame and a last received frame which did not comprise voice.

9. The voice activity detector of claim 7, wherein the estimate of the second SNR of the received frame is a long term estimate measured over a plurality of frames.

10. The voice activity of claim 7, wherein the voice activity detector is a primary voice activity detector.

11. The voice activity detector of claim 9, wherein the processor is further configured to:

when comparing the determined first SNR with the adaptive threshold, adjust the estimate of the second SNR of the received frame upwards responsive to the current estimate of the second SNR being determined to be lower than a smooth input dynamics measure, wherein the smooth input dynamics measure is indicative of energy dynamics of the received frame.

12. The voice activity detector of claim 11, wherein the estimate of the second SNR of the received frame is adjusted upwards to a value which is less than or equal to the smooth input dynamics measure.

* * * * *